United States Patent [19]

Watkins

[11] Patent Number: 5,323,978
[45] Date of Patent: Jun. 28, 1994

[54] TAPE WINDING METHOD AND APPARATUS FOR FORMING FRICTION ELEMENTS

[75] Inventor: Adrian H. Watkins, Hannahs Cottage, United Kingdom

[73] Assignee: Ferodo Limited, Manchester, England

[21] Appl. No.: 916,839

[22] PCT Filed: Apr. 9, 1991

[86] PCT No.: PCT/GB91/00555

§ 371 Date: Aug. 14, 1992

§ 102(e) Date: Aug. 14, 1992

[87] PCT Pub. No.: WO91/15354

PCT Pub. Date: Oct. 17, 1991

[30] Foreign Application Priority Data

Apr. 11, 1990 [GB] United Kingdom ............... 9008293

[51] Int. Cl.$^5$ .................... B29C 53/46; B29C 67/17; B29L 31/16; F16D 69/00
[52] U.S. Cl. ........................ 242/1; 242/7.08; 156/447
[58] Field of Search .............. 156/446, 447; 242/1, 242/7.02, 7.08, 7.03, 7.23

[56] References Cited

U.S. PATENT DOCUMENTS

| | | | |
|---|---|---|---|
| 3,698,651 | 10/1972 | Miller | 242/7.23 |
| 3,743,069 | 7/1973 | Barnett . | |
| 4,049,482 | 9/1977 | Webb . | |
| 4,249,704 | 2/1981 | Sakaue et al. . | |

FOREIGN PATENT DOCUMENTS

| | | | |
|---|---|---|---|
| 0010956 | 5/1980 | European Pat. Off. . | |
| 0093790 | 5/1982 | European Pat. Off. . | |
| 2516649 | 10/1976 | Fed. Rep. of Germany | 242/7.23 |
| 2035257A | 6/1980 | United Kingdom . | |
| 2096654 | 10/1982 | United Kingdom . | |
| 2139182A | 11/1984 | United Kingdom . | |

Primary Examiner—Andrew M. Falik
Attorney, Agent, or Firm—Nixon & Vanderhye

[57] ABSTRACT

A preform suitable to be cured to form a friction element, such as clutch facing, is produced by winding a filament, or a tape containing curable material on to a surface of a rotating plate. The filament, or tape, is guided on to the surface by a guide which is movable in a plane. A signal, representative of the angular position of the plate, causes generation of a demand signal indicating the desired position of the guide. A closed loop control, controls the movement of the guide to give a predetermined winding pattern. The control causes the guide to move as a function of the demand signal and a feedback signal representative of the position of the guide. The curable material in the preform is then cured.

7 Claims, 3 Drawing Sheets

TAPE WINDING METHOD AND APPARATUS FOR FORMING FRICTION ELEMENTS

BACKGROUND OF THE INVENTION

The present invention relates to the fabrication of friction elements and, in particular, to the winding of a filament, or a tape, into a generally disc-shaped preform suitable to be cured to form a friction element.

Disc-shaped friction elements, for example, are employed as the facings for clutches, the facing being secured to a backing plate, for example, by rivets. For convenience, hereinafter in this specification, reference is made only to a friction element comprising a facing for a clutch, but it will be understood that, where appropriate, such references to a facing for a clutch refer also to any friction element made by a similar process.

Many different compositions of the filaments, and tapes, have been used in winding such preforms, for example, a composition as disclosed in British patent specification No. 2,096,654.

In present methods of winding a filament, or a tape, into a generally disc-shaped preform, the filament, or tape, is guided on to a rotating face plate by a guide which is moved in a displacement plane around a path. The shade of the path is determined by a rotating cam. The winding pattern of the filament, or tape, on to the face plate can only be varied by changing the cam for one with a different profile and only relatively simple winding patterns are possible.

It is an object of the present invention to provide a method of winding a filament, or a tape, into a generally disc-shaped preform suitable to be cured to form a friction element which allows the preform to be wound without relying on the shape of a cam to determine the movement of the guide thereby enabling more complex and consistent winding patterns to be used.

BRIEF SUMMARY OF THE INVENTION

The invention provides a method of winding a filament, or a tape, into a generally disc-shaped preform suitable to be cured to form a friction element, the method comprising rotating a face plate about an axis, the face plate having a substantially planar surface extending radially of said axis, and guiding said filament, or tape, on to said planar surface by means of a guide which is movable in a displacement plane to determine the pattern in which the filament, or tape is wound on to the planar surface, characterised in that the method also comprises producing a plate position signal representative of the angular position of the face plate about said axis, producing a demand signal representative of a demanded position of the guide in the displacement plane, the demand signal being produced in response to the plate position signal and varying therewith to provide a predetermined winding pattern, producing a feedback signal representative of the position of the guide in the displacement plane, and moving the guide in the displacement plane as a function of the demand signal and the feedback signal by means of a closed loop control.

In a method in accordance with the invention, the winding pattern is controlled in accordance with a demand signal which allows greater complexity and consistency than present cam-based methods. For example, the pattern can be different for different parts of a preform and it can be ensured that both ends of the filament, or tape, are at an inside edge of the preform which cannot be achieved with present methods. Problems of cam wear and delays while cams are changed are also avoided.

In a method in accordance with the invention, a speed signal may be produced representing the speed of displacement of the guide in the displacement plane, and the speed signal may be utilised to limit the speed or acceleration applied to the guide. This provision can be used to reduce the possibilities of whip-like effects occurring in the filament, or tape, and the possibility of breakage.

The invention also provides apparatus for winding a filament, or a tape, into a generally disc-shaped preform suitable to be cured to form a friction element, the apparatus comprising a face plate having a substantially planar surface, rotating means operable to rotate the face plate about an axis extending normally of the planar surface of the face plate, a guide for said filament, or tape, arranged to guide the filament, or tape, on to the planar surface of the face plate, and moving means operable to move the guide in a displacement plane to determine the pattern in which the filament, or tape, is wound on to the planar surface, characterised in that the apparatus also comprises angular position determining means operable to produce a plate position signal representative of the angular position of the face plate about said axis, producing means operable in response to the plate position signal to produce a demand signal representative of a demanded position of the guide in the displacement plane, the demand signal varying with the plate position signal to provide a predetermined winding pattern, guide position determining means operable to produce a feedback signal representative of the position of the guide in the displacement plane, and closed loop control means operable to control the operation of the moving means so that the guide is moved in the displacement plane as a function of the demand signal and the feedback signal.

The moving means may be operable to move the guide arcuately in the displacement plane. In this case, the demand signal represents an angular position of the guide about the center of curvature of the arc. The moving means may also be operable to move the guide linearly towards or away from the axis of the face plate, thereby enabling the position of the arc to be adjusted for a particular size of preform. The filament, or tape, in passing through the guide may pass through the centre of curvature of the arc along which the guide moves, thereby reducing the inertia of the guide.

BRIEF DESCRIPTION OF THE DRAWINGS

The present invention will now be described by way of example with reference to the accompanying drawings in which.

DETAILED DESCRIPTION OF THE PREFERRED EMBODIMENTS

Figure 1:
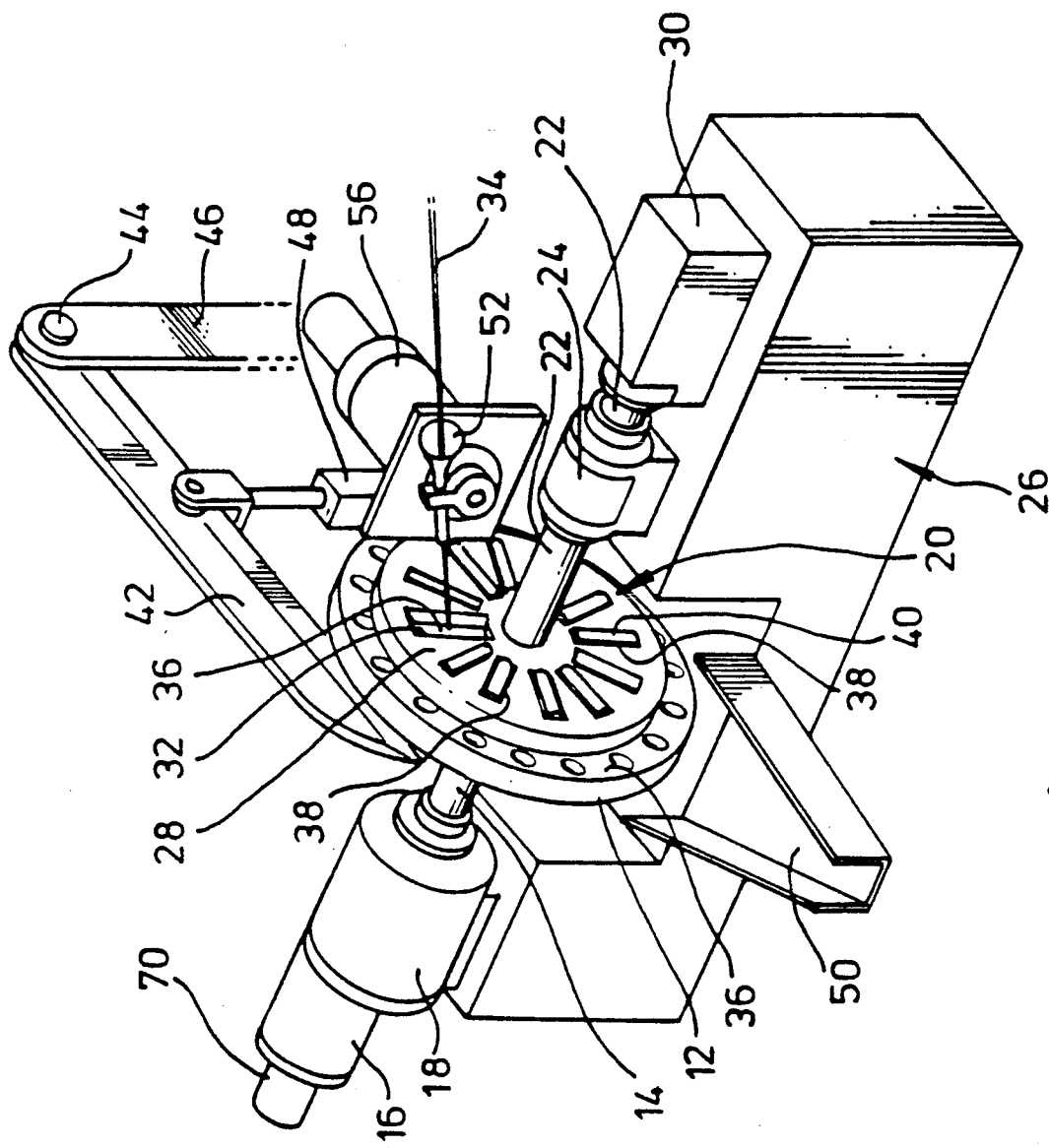
FIG. 1 is a perspective view of one embodiment of an apparatus, in accordance with the present invention, for winding a filament, or tape, to provide a generally disc-shaped preform.
Figure 2:
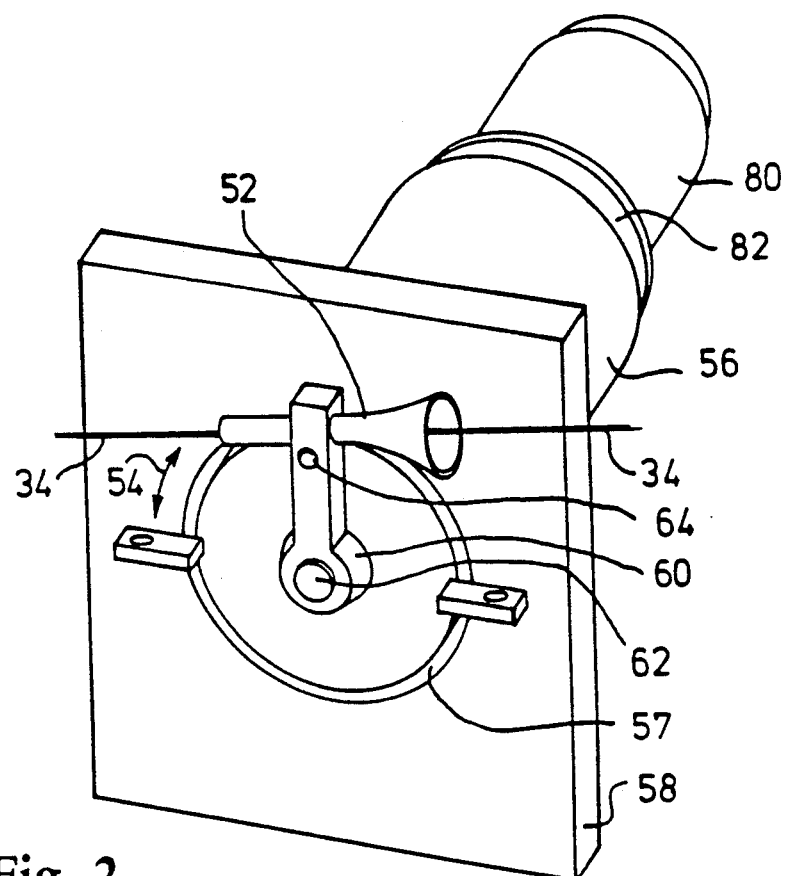
FIG. 2 illustrates in greater detail a guide for the filament, or tape, included in the apparatus of FIG. 1, the guide being shown mounted on moving means arranged to move the guide along a restricted arc by energization of a motor of the moving means.
Figure 3:
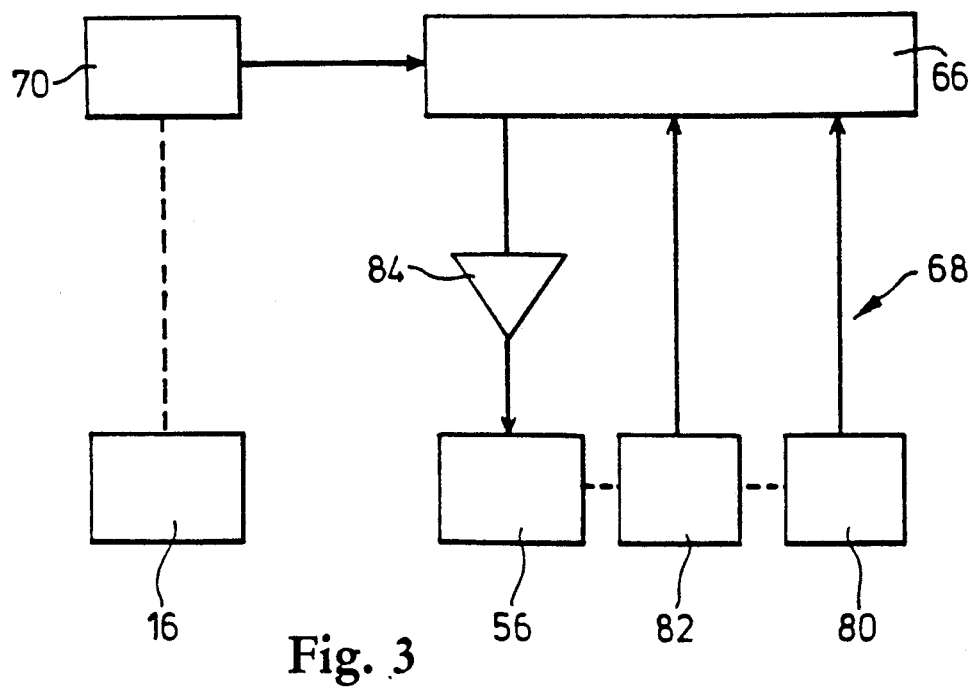
FIG. 3 is a block diagram representative of the closed loop control means of the apparatus of FIGS. 1 and 2.

The apparatus shown in FIGS. 1 to 3 is for winding a filament, or tape, 34 into a generally disc-shaped preform suitable to be cured to form a friction element in the form of a clutch facing. The apparatus comprises a drilled face plate 12 which has a substantially planar vertically-extending annular surface 36. The plate 12 is mounted to rotate about a horizontal central axis thereof by being secured to the spindle 14 of a motor 16, the motor having an associated gear box 18. The motor 16 provides rotating means operable to rotate the face plate 12 about the horizontal axis which extends normally of the planar surface of the face plate. The face plate 12 is included in a headstock of the apparatus. A co-operating tail-stock 20 of the apparatus is mounted on a spindle 22, coaxial with the motor spindle 14, and the spindle 22 is supported in a bearing 24. The motor 16 and the bearing 24 are mounted on a base, indicated generally at 26.

The face plate 12 has the diameter greater than that of the generally cylindrically-shaped motor 16, and partially resides in a transverse channel formed in the base 26 extending between the motor and the bearing 24.

The tailstock 20 comprises an annular-shaped plate 28, of the same diameter as the face plate 26. The spindle 22 mounting the tailstock 20 is capable of reciprocating within the bearing 24, under the control of a displacing unit indicated generally at 30. The tailstock 20 is held against rotating with the face plate in any convenient manner, by means such as a second, anti-rotation, bearing (not shown).

A radially extending rectangular aperture 32 is provided in the plate 28, through which aperture the filament, or tape, 34 is fed to be deposited on the opposing plane annular surface 36 of the face plate 12. The arrangement is such that the aperture 32 extends vertically. A plurality of smaller, radially extending apertures 38 also are provided in the plate 28, these apertures being equi-angularly separated from each other over the part of the plate not containing the vertical aperture 32 for the filament, or tape, 34. Mounted for rotation about a radially extending axis within each of the smaller apertures 38 is a roller 40, the arrangement being such that each roller protrudes from its associated aperture at least on the side of the plate 28 opposite to the rotating face plate 12.

When the tailstock 20 is displaced by the unit 30 to one extremity of the stroke of its reciprocating movement, the rollers 40 engage the surface 36 of the rotating face plate 12 or any filament, or tape, 34 deposited on the surface 36. Thus, the rollers 40 are caused to rotate with the surface 36, as the surface 36 rotates relative to the tailstock 20. The arrangement is such that the displacing unit 30 causes the rollers 40 to apply pressure to the deposited filament, or tape, 34, causing it to compact, and to form a required preform (not shown) of sufficient strength to be capable of being handled, before the preform is cured to form the required clutch facing. When a required preform has been produced on the surface 36 of the face plate 12, and the supply of the filament, or tape, 34 to the face plate 12 has ceased, the displacing unit 30 is energized to cause the tailstock 20 to move away from the face plate 12;

The completed preform is removed from the face plate 12 by actuation of a cut-off blade 42. One end of the blade 42 is pivotably mounted at 44 on a supporting arm 46, and is displaced by an actuator indicated at 48. The arrangement is such that during the production of a preform the blade 42 is held at a home position spaced from the face plate 12. However, when the preform has been completed, and the tailstock 20 has been moved away from the face plate 12, the blade is moved to be brought between the surface 36 of the face plate and the preform, to cause the release of the preform from the surface. Hence, the preform falls away from the surface 36, and is directed by a chute 50 away from the machine.

The supply of the filament, or tape, 34 to the face plate is then re-commenced, the tailstock 20 is moved back into engagement with the face plate 12, and the production of the next preform is begun.

The appropriate amount of the filament, or tape, 34 to form a required preform is supplied to the machine discretely in a bin (not shown). One extremity of the filament, or tape, is arranged to protrude from the bin; and when the bin is in its required location, this extremity is engaged by a pair of feed rollers (not shown), and is fed, through a tube (not shown), and via a guide 52 arranged to guide the filament, or tape, on to the surface 36 of the face plate 12, to be secured thereto. Subsequently, the feed rollers are disengaged from the filament, or tape, and the filament, or tape, is pulled from the bin by rotation of the face plate.

The guide 52 is inclined at any appropriate angle to the plane of the surface 36, but for the sake of simplicity is shown as extending at right angles thereto. The guide 52 may have any convenient form, but the illustrated embodiment is trumpet-shaped, the flared end of the guide facilitating the feeding of a leading end of a discrete length of the filament, or tape, through the guide. When leaving the other end of the guide, the filament, or tape, is directed on to the surface 36 of the face plate 12, through the vertical aperture 32 in the plate 28 of the tailstock, this end of the guide being opposite to the aperture 32.

Because, as the filament, or tape, 34 is wound on the face plate 12, it is required to be directed by the guide 52 on to positions of the surface 36 of the face plate at different radial distances from the spindle 14, the guide has to be displaced bidirectionally in an appropriate manner in a displacement plane in which the guide extends. To this end, the apparatus comprises moving means operable to move the guide 52 in the displacement plane to determine the pattern in which the filament, or tape, is wound on to the surface 36. In this case, the moving means is a motor 56 which is operable to move the guide arcuately in the displacement plane as indicated by the arrows 54 in FIG. 2. The motor 56 is adjustably mounted within an aperature 57 through a rectangular-shaped bracket 58. A vertically extending taper collet device, indicated generally at 60, is mounted on the horizontal axle 62 of the motor, with the guide 52 supported by this device.

The motor 56 extends horizontally on the opposite side of the bracket 58 to the guide 52. The taper collet device 60, and the guide 52, are displaced upon energisation of the motor 56. Over an extended period of use, wear on the motor 56 can be evened out by rotating the motor relative to the bracket 58, and the arrangement re-datumed via a location hole 64.

In order that the filament, or tape, 34 is deposited in a precise manner, the arrangement of the moving means is required to be such that the guide 52 is displaced precisely to a position represented by an instantaneous demand signal. As shown in FIG. 3, the demand signal is supplied from a processor which provides producing means 66 to a closed Loop control means 68. The producing means 66 also receives input data, so that there is obtained a sequence of electrical signals to drive the motor 56, causing the filament, or tape, to be deposited on the face plate 12 with a selected one of a plurality of obtainable predetermined winding patterns.

The apparatus of FIGS. 1 and 2 also comprises angular position determining means in the form of a shaft encoder 70 which is mounted on the spindle 14 of the motor 16. The shaft encoder 70 is operable to produce a plate position signal, in the form of a train of pulses, which is representative of the instantaneous position of the face plate 12 about the axis about which it rotates. These signals are supplied to the producing means 66 which is operable in response to the plate position signal, a demand signal representative of the demanded, or desired, corresponding instantaneous position of the guide 52 in the displacement plane. The demand signal varies with the plate position signal to provide a predetermined winding pattern. Thus, the position of the guide 52 varies throughout the winding of a preform in correspondence to determined changes in the angular position of the face plate 12, so that a required winding action is obtained.

The apparatus also comprises guide position determining means in the form of a shaft encoder 80 mounted on the motor 56. The shaft encoder 80 is operable to produce a feedback signal representative of the position of the guide 52 in the displacement plane.

As is shown in FIG. 3, the closed loop control means 68 is operable to control the operation of the motor 56 so that the guide 52 is moved in the displacement plane as a function of the demand signal and the feedback signal. The producing means 66 receives the position feedback electrical signals from a shaft encoder 80 and energizes the motor 56 through a servo-amplifier 84. The producing means 66 controls the motor 56 essentially in accordance with the difference between the demand signal and the feedback signal. However, the producing means 66 also limits the speed or acceleration of the guide 52 by utilizing a speed signal. The speed signal is produced by speed detecting means in the form of a tachometer 82 mounted on the motor 56. The speed signal is representative of the speed of displacement of the guide 52 in the displacement plane. The speed signal could alternatively be produced by differentiation of the signals from the shaft encoder 80. In response to the receipt of simultaneous demand and feedback signals being supplied to the producing means 66, there is determined any instantaneously required displacement of the guide 52, and there is provided to the motor 56 an electrical control signal to cause the required displacement of the guide to be obtained.

In an unillustrated modification of the moving means of FIG. 2, the taper collet device is omitted, and the guide 52 is mounted directly on the axle 62 of the motor 56 so that, the filament, or tape, in passing through the guide passes through the center of curvature of the arc along which the guide moves.

Figure 4:
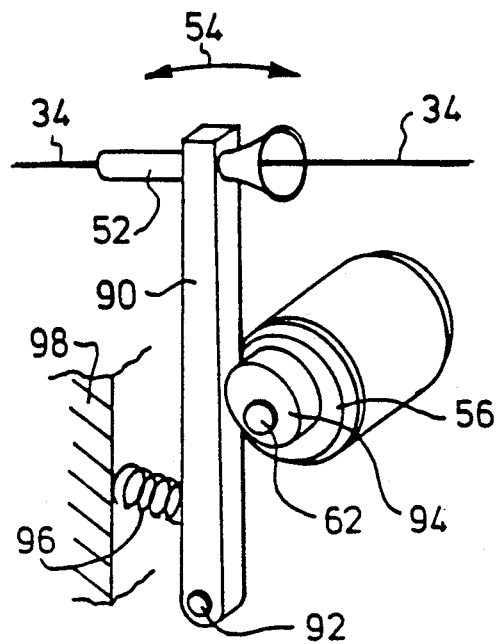
FIGS. 4 and 5 each illustrate alternative combinations of a guide and moving means.

An alternative moving means for displacing the guide 52 is shown in FIG. 4. In this arrangement, the guide 52 is mounted on an arm 90 pivoted at a point 92 spaced from the guide. Mounted on the axle 62 of the motor 56 is a cam 94. The arm 90 bears directly on the profiled surface of the cam 94 under the action of a spring 96 held in compression between the arm and an anchorage 98. The cam 94 is in contact with a part of the arm 90 intermediate between the guide 52 and the pivot point 92, the arrangement being such that rotation of the cam by the motor causes the arm, and hence, also the guide 52, to rotate over a restricted range, as indicated by the arrows 54.

Figure 5:
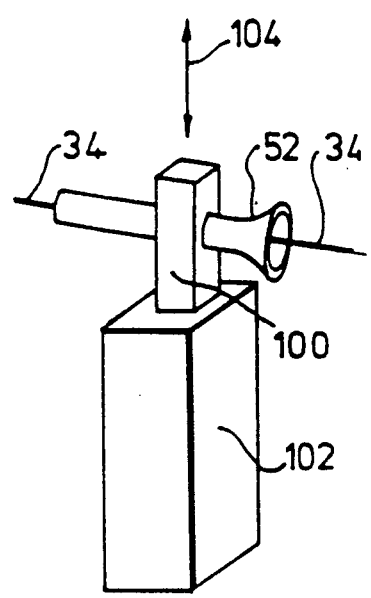

A further alternative moving means for displacing the guide 52 is shown in FIG. 5. In this arrangement, the guide 52 is mounted directly on the moving member 100 of a linear motor 102, the linear motor having an integral position sensor (not shown), in response to energization of the linear motor the guide is displaced as indicated by the arrows 104.

Shown in FIG. 6 are constituent layers of different patterns for the deposited filament, or tape, capable of being obtained by employing the machine described above.

Figure 6A:
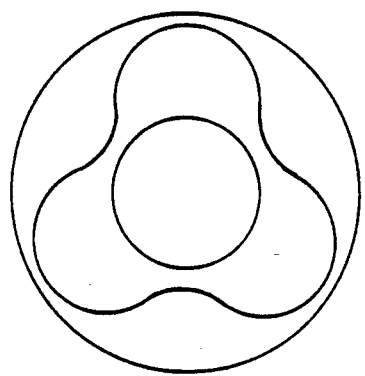
FIGS. 6(a)-(c) shows diagrammatically constituent layers of different patterns for the deposited filament, or tape, capable of being obtained by employing the apparatus of FIG. 1.
Figure 6B:
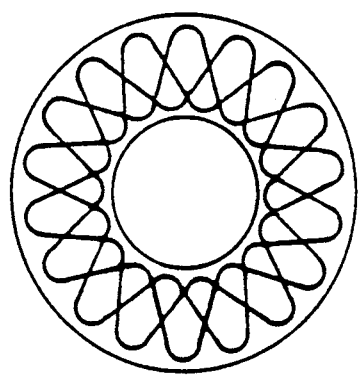

FIG. 6a is of a constituent layer of a known pattern, in which the filament, or tape, 34 undulates in a regular manner over the whole of the annular-shaped planar surface 36 of the face plate 12, with the filament, or tape, being adjacent to a plurality of equi-angularly separated locations of each of the radially inner, and outer, peripheries of the surface. For convenience, all the locations referred to above are shown as being uniformly distributed along the peripheries of the surface. Usually, however, the preform has a plurality of such layers, and the locations are not as shown in FIG. 6a, but such that all the locations of the constituent layers of the preform are equi-angularly separated, the deposited pattern having the form of a rosette as shown in FIG. 6b. In FIG. 6b only three constituent layers of the pattern are illustrated, but the complete rosette may have more layers.

Figure 6C:
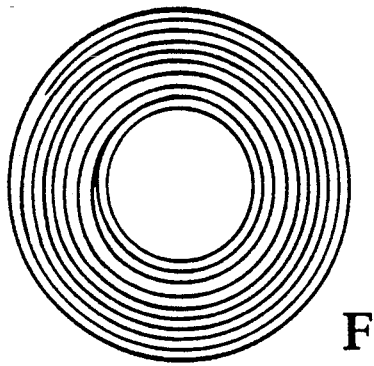

Shown in FIG. 6c is one layer of a known pattern comprising a spiral of the deposited filament, or tape 34, the spiral form extending over the whole of the annular-shaped planar surface of the face plate.

The apparatus described above is used in a method, according to the invention, of winding the filament, or tape, 34 into a generally disc-shaped preform. In the method, the face plate 12 is rotated at constant speed by operation of the motor 16. The filament, or tape, 34 is guided on to the planar surface 36 of the plate 12 by the guide 52 and the guide 52 is moved in the displacement plane by operation of the motor 56 to determine the pattern which is wound. In the method, a plate position signal is produced by the shaft encoder 76, and a demand signal is produced by producing means 66 in response to the plate position signal. The demand signal may be calculated according to an equation or drawn from a memory in which it is stored in tabulated form. The demand signal varies with the plate position signal to give the predetermined winding pattern.

Also in the method, a feedback signal is produced, by the shaft encoder 80, representative of the position of the guide 52 in the displacement plane. The producing means 66 operates the servo-amplifier 84 according to a function representing the difference between the demand signal and the feedback signal but is subject to limits on speed and acceleration derived from a speed signal produced by the tachometer 82.

I claim:

1. A method of forming a friction element by first forming a generally disc-shaped preform and curing the preform to form the friction element, the method comprising rotating a face plate about a central axis thereof, the face plate having a substantially planar surface extending radially of said axis; producing a plate position signal representative of the angular position of the face plate about said axis; guiding a filament, or a tape incorporating curable material on to said planar surface as the face plate rotates by means of a guide through which the filament, or tape, passes, the position of the guide determining a distance from said axis to which said filament, or tape is directed; producing a feedback signal representative of the distance of the guide from said axis; producing a demand signal representative of a demanded position of the guide to cause the filament, or tape, to be deposited on the face plate in a predetermined winding pattern having a plurality of overlying layers, the demand signal being produced in response to the plate position signal and varying therewith; moving the guide as a function of the demand signal and the feedback signal by means of a closed loop control so that the filament, or tape, is wound on to said planar surface of the face plate in said predetermined winding pattern thereby forming a wound preform; and removing the wound preform from the face plate.

2. The method according to claim 1, further comprising producing a speed signal representing the speed of movement of the guide, and utilizing the speed signal to limit said speed of movement of said guide or the acceleration of said guide.

3. Apparatus for forming a generally disc-shaped preform which can be cured to form a friction element, by winding a filament, or a tape, into a predetermined pattern having a plurality of overlying layers, the apparatus comprising: a face plate having a substantially planar surface; rotating means operable to rotate the face plate about a central axis thereof extending normally of the planar surface of the face plate; a guide for said filament, or tape, arranged to guide the filament, or tape, on to the planar surface of the face plate as the face plate rotates, the position of said guide determining a distance from said axis to which the filament or tape is directed; moving means operable to move the guide to determine the pattern in which the filament, or tape, is wound on to the planar surface; angular position determining means operable to produce a plate position signal representative of the angular position of the face plate about said axis; producing means operable in response to the plate position signal to produce a varying demand signal representative of a demanded position of the guide to provide said predetermined winding pattern; guide position determining means operable to produce a feedback signal representative of the distance of the guide from said axis; closed loop control means operable to control the operation of the moving means so that the guide is moved as a function of the demand signal and the feedback signal; and removing means operable to remove a preform from the face plate.

4. Apparatus according to claim 3, wherein the moving means is operable to move the guide arcuately in a displacement plane extending normally of said planar surface of said face plate.

5. Apparatus according to claim 3, wherein the moving means is operable to move the guide linearly towards or away from the axis of the face plate.

6. Apparatus according to claim 3, wherein the apparatus further comprises speed detecting means operable to produce a speed signal representative of the speed of movement of the guide, and the control means is operable to limit said speed of movement or the acceleration of the guide in response to said speed signal.

7. Apparatus according to claim 3, wherein the apparatus further comprises a plurality of rollers arranged to apply pressure to filament, or tape, deposited on said face plate.

* * * * *